United States Patent
Ramachandran et al.

(10) Patent No.: US 9,715,380 B2
(45) Date of Patent: Jul. 25, 2017

(54) TECHNIQUES FOR ENABLING DYNAMIC UPDATE OF DEVICE DATA MODELS

(71) Applicant: CISCO TECHNOLOGY, INC., San Jose, CA (US)

(72) Inventors: Milan Paliath Ramachandran, Bangalore (IN); Krishna Sundaresan, Bangalore (IN); Anand Brahmanand Agarwal, Bangalore (IN); Ramesh Kumar Veerapaneni, Bangalore (IN); Vijaya Chandra Arroju, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 14/721,923

(22) Filed: May 26, 2015

(65) Prior Publication Data

US 2016/0350095 A1  Dec. 1, 2016

(51) Int. Cl.
*G06F 9/445* (2006.01)
*H04L 29/08* (2006.01)

(52) U.S. Cl.
CPC ............... *G06F 8/65* (2013.01); *H04L 67/34* (2013.01); *G06F 8/60* (2013.01); *G06F 8/61* (2013.01); *G06F 9/445* (2013.01)

(58) Field of Classification Search
CPC ..... G06F 8/60; G06F 8/61; G06F 8/65; G06F 9/445; H04L 67/34
See application file for complete search history.

(56) References Cited

U.S. PATENT DOCUMENTS

| 7,555,743 | B2 * | 6/2009 | Sridhar | G06F 8/20 717/106 |
| 2005/0257193 | A1 * | 11/2005 | Falk | G06F 8/315 717/109 |
| 2006/0012393 | A1 * | 1/2006 | Raju Datla | H04L 41/16 326/39 |
| 2010/0057849 | A1 * | 3/2010 | Ji | H04L 41/0681 709/203 |

(Continued)

OTHER PUBLICATIONS

Scott et al. "Yang Module for NETCONF Monitoring" Oct. 2010, 56 pages.*

(Continued)

*Primary Examiner* — Viva Miller
(74) *Attorney, Agent, or Firm* — Patent Capital Group

(57) ABSTRACT

A method is provided in one example embodiment and includes transmitting a message from a network element to a network controller, the message identifying a data store of the network controller and a data model and a transformation document stored in the identified data store; downloading the identified data model and identified transformation document to the network element; applying the downloaded transformation document to the downloaded data model to generate a platform interface file; and programming the platform interface file at the network element. In certain embodiments, the data model is a YANG data model; in other embodiments, the data model is a YIN representation of a YANG data model. The transformation document may comprise eXtensible Stylesheet Language Transformation ("XSLT") document.

20 Claims, 10 Drawing Sheets

(56) References Cited

U.S. PATENT DOCUMENTS

| | | | |
|---|---|---|---|
| 2012/0110028 A1* | 5/2012 | Athreya | G06F 17/303 707/803 |
| 2014/0078930 A1 | 3/2014 | Bevemyr | |
| 2015/0019991 A1 | 1/2015 | Kristjansson | |
| 2015/0049631 A1* | 2/2015 | Heron | H04L 45/02 370/254 |
| 2015/0092604 A1 | 4/2015 | Bevemyr | |

OTHER PUBLICATIONS

Enns, et al., "Network Configuration Protocol (NETCONF)," Internet Engineering Task Force (IETF), RFC: 6241, Jun. 2011, 113 pages; http://www.rfc-editor.org/rfc/pdfrfc/rfc6241.txt.pdf.

Bjorklund, "Yang—A Data Modeling Language for the Network Configuration Protocol (NETCONF)," Internet Engineering Task Force (IETF), RFC: 6020, Oct. 2010, 173 pages; http://tools.ietf.org/html/rfc6020.

\* cited by examiner

The edit-config Netconf operations shall be supported on the <dynamic-data-models> datastore. (with create, delete operation types supported)..

```
<rpc message-id="101"
    xmlns="urn:ietf:params:xml:ns:netconf:base:1.0"
    xmlns:nc="urn:ietf:params:xml:ns:netconf:base:1.0">
<edit-config>
  <target>
    <dynamic-data-models/>        DATA STORE
  </target>
  <config>
    <model>
      <model-name nc:operation="create">      NEW MODEL INSERTION
        y1731
      </model-name>
      <model-version>
        "1.0"
      </model-version>
      <yang-url>                URL FOR DATA MODEL
        https://xnc-controller>/models/y1731.yang
      </yang-url>
      <platform-model-transform>     URL FOR DATA MODEL
        https://xnc-controller>/models/y1731.xsl
      </platform-model-transform>
    </model>
  </config>
</edit-config>
</rpc>
```

FIG. 4

Input XML file
```
<?xml version="1.0" encoding="UTF-8"?>
<!--Sample XML file generated by XMLSpy v2014 sp1 (http://www.altova.com)-->
<syslog_configuration xmlns:xsi="http://www.w3.org/2001/XMLSchema-instance" xsi:noNamespaceSchemaLocation="syslog.xsd">
    <logging_enable>false</logging_enable>
    <logging_host>1.2.3.4</logging_host>
    <logging_level>
        <info>text</info>
    </logging_level>
</syslog_cofiguration>
```

FIG. 7B

```
<xsl:stylesheet version="1.0" xmlns:xsl="http://www.w3.org/1999/XSL/Transform" xmlns:agt="http://www.altova.com/Mapforce/agt" xmlns:xs="
http://www.w3.org/2001/XMLSchema" exclude-result-prefixes="agt xs">
    <xsl:output method="xml" encoding="UTF-8" indent="yes"/>
    <xsl:template name="agt:MapTocommand_set_var6_create_commandstring">
        <xsl:param name="var5_current"/>
        <command_string>
            <xsl:value-of select="concat('logging host ' , string($var5_current/logging_host))"/>
        </command_string>
    </xsl:template>
    <xsl:template name="agt:MapTocommand_set_var8_create_commandstring">
        <xsl:param name="var7_current"/>
        <command_string>
            <xsl:choose>
                <xsl:when test="string((translate(string($var7_current/logging_enable), '1falseru0 ', 't')) = 't')) != 'false'">
                    <xsl:value-of select="'logging on'"/>
                </xsl:when>
                <xsl:otherwise>
                    <xsl:value-of select="'no logging on'"/>
                </xsl:otherwise>
            </xsl:choose>
        </command_string>
    </xsl:template>
    <xsl:template match="/">
        <xsl:variable name="var3_resultof_filter"/>
        <xsl:for-each select="syslog_configuration">
            <xsl:variable name=":var1_info">
```

FIG. 7C

OUTPUT DEVICE CLI XML
<xml version="1.0" encoding="UTF-8"?>
<command_set_ecos xmlns:xsl="http://www.w3.org/2001/XMLSchema-instance" xsi:noNamespaceSchemaLocation=C:/workspace/xsltcommand_set.xsd">
    <command_string>configure 1<command_string>
    <command_string>logging host 1.2.3.4<command_string>
    <command_string>no logging on<command_string>
    <command_string> logging level info<command_string>

FIG. 7D

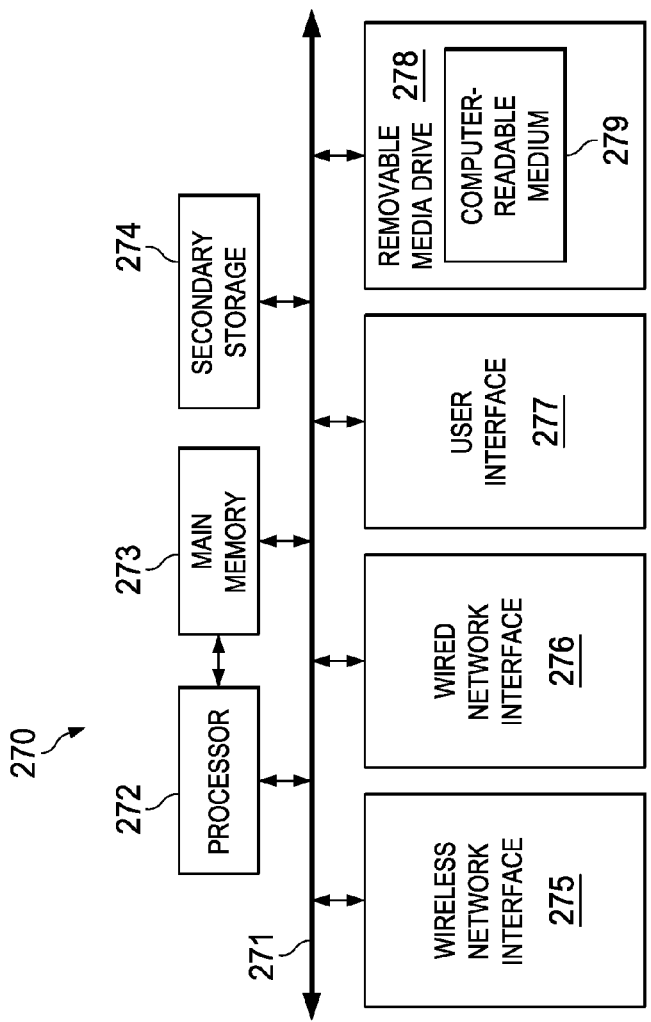

FIG. 8

TECHNIQUES FOR ENABLING DYNAMIC UPDATE OF DEVICE DATA MODELS

TECHNICAL FIELD

This disclosure relates in general to the field of communications networks and, more particularly, to techniques for enabling dynamic update of device data models in such networks.

BACKGROUND

Network Configuration ("NETCONF") protocol for device Application Programming Interface ("API") exposure and YANG-YIN/XSD data models for many areas of technology need to be developed and tested across a variety of platforms. Service providers that move to Software Defined Networks ("SDNs") must consider the logistics of upgrading hundreds to thousands of network elements comprising routers and switches. YANG models are likely to be delivered over a span of several years, resulting in the necessity of a network Interworking Operating System ("IOS") (IOS/IOS XE/IOS XR) upgrade across all of the network elements being managed by the SDN controller every 3-6 months per release cycle.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 4 illustrates example computer programming instructions for enabling dynamic update of network device data models in accordance with embodiments described herein;

FIG. 7B illustrates an XML input file conforming to XSD for use in implementing a technique for enabling dynamic update of network device data models in accordance with embodiments described herein;

FIG. 7C illustrates an XSLT specification for SXD applied to the XML input file of FIG. 7B for use in implementing a technique for enabling dynamic update of network device data models in accordance with embodiments described herein;

FIG. 7D illustrates an output XML file for use in implementing a technique for enabling dynamic update of network device data models in accordance with embodiments described herein; and FIG. 8 illustrates a machine comprising an element of the network environment of FIG. 1 for use in implementing a technique for enabling dynamic update of network device data models in accordance with embodiments described herein.

DETAILED DESCRIPTION OF EXAMPLE EMBODIMENTS

Overview

Figure 1:
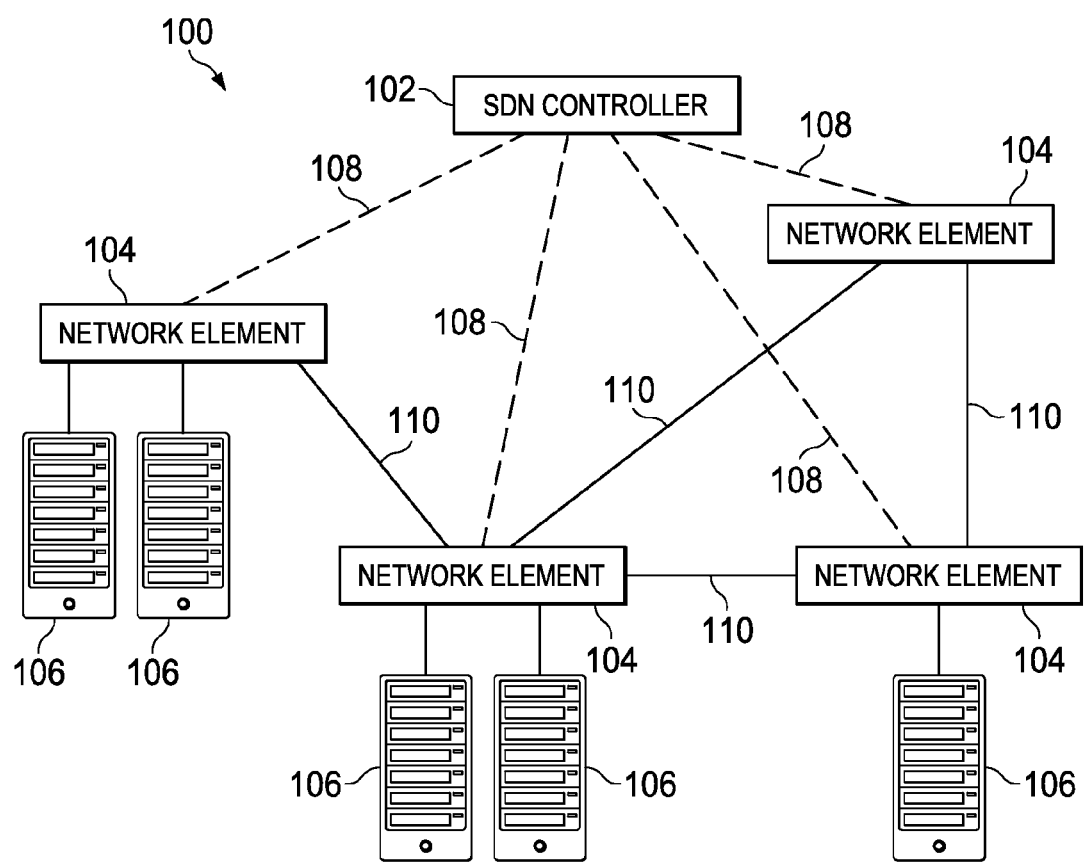
FIG. 1 is a simplified block diagram of a network environment in which a technique for enabling dynamic update of network device data models in accordance with embodiments described herein may be implemented.

A method is provided in one example embodiment and includes transmitting a message from a network element to a network controller, the message identifying a data store of the network controller and a data model and a transformation document stored in the identified data store; downloading the identified data model and identified transformation document to the network element; applying the downloaded transformation document to the downloaded data model to generate a platform interface file; and programming the platform interface file at the network element. In certain embodiments, the data model is a YANG data model; in other embodiments, the data model is a YIN representation of a YANG data model. The transformation document may comprise eXtensible Stylesheet Language Transformation ("XSLT") document and the platform interface file may comprise one of a Command Line Interface ("CLI") file and an Application Programming Interface ("API") file. In particular embodiments, the transmitting and downloading may be performed using a NETCONF session, in which case the network element may comprise a NETCONF server and the network controller may comprise a NETCONF client.

Example Embodiments

It will be assumed for the sake of illustration throughout this disclosure that network elements described and implemented herein support NETCONF protocols and Yang data models. The NETCONF protocol, as specified in Internet Engineering Task Force Request for Comments 6241 entitled "Network Configuration Protocol (NETCONF)" (hereinafter referred to as "IETF RFC 6241"), defines a mechanism for use in managing network elements, retrieving configuration data, and uploading/manipulating configuration data. The protocol enables a network element to expose a full, formal API that may be used by applications to send and receive full or partial configuration data sets. The NETCONF protocol uses a remote procedure call ("RPC") paradigm. A client encodes an RPC in Extensible Markup Language ("XML") and sends it to a server using a secure, connection-oriented session. The server responds with an XML-encoded response. The contents the request and the response are fully described in XML DTDs, XML schemas, or both, allowing both the client and the server to recognize the syntax constraints imposed on the exchange.

A significant aspect of NETCONF is that the functionality of the management protocol closely mirrors the native functionality of the network element, thereby reducing implementation costs and allowing timely access to new features. Additionally, it provides applications with access to both the syntactic and semantic content of the network element's native user interface. The NETCONF protocol is an important element of automated configuration. XML provides a flexible and specific encoding mechanism for hierarchical content. NETCONF can be used in combination with XML-based transformation technologies (e.g., Extensible Stylesheet Language Transformation ("XSLT")), to enable automated generation of full and partial configurations. Data regarding networking topologies, links, policies, customers, and services, may be queried from databases and transformed (using XSLT scripts) from a task-oriented, vendor-independent data schema into a format specific to the vendor, product, operating system, and/or software release, which may be passed to the network element using the NETCONF protocol.

As defined in Internet Engineering Task Force Request for Comments 6020 entitled "YANG—A Data Modeling Language for the Network Configuration Protocol (NETCONF)" (hereinafter referred to as "IETF RFC 6020"), YANG is a data modeling language for modeling configuration and state data manipulated by NETCONF. In particular, YANG is used to model the operations and content layers of NETCONF, as described in IETF RFC 6241, Section 1.2. IETF RFC 6020 details the syntax and semantics of the YANG language, as well as how the data model defined in a YANG module is represented in XML and how NETCONF operations are used to manipulate the data.

In accordance with features described hereinbelow, a new NETCONF capability, designated herein as "data-model-update," is defined for the purposes of enabling installation/updating/removal of operations of a 2-tuple defined as (yin-data-model, platform-model-transform) in a data store "<dynamic-data-models>". "yin-data-model" is a YIN representation of a new YANG data model to be installed on a network element. "platform-model-transform" is an XML document, which is usually but not always an XSLT document that enables transformation of the YIN representation to Command Line Interface ("CLI")/API via a transform engine. If the "platform-model" is Extensible Stylesheet Language ("XSL"), then an XSLT processor may be used to perform the conversion of the YIN representation to the network element, or device, CLI/API.

As will be described in greater detail below, when a new data-model needs to be edited or introduced into the network element, an SDN controller performs an edit-config operation on the above-referenced <dynamic-data-store>. The edit-config operation specifies URLs for the YANG model and the associated platform-model-transform. The platform-model-transform may be an XSLT document. The network element subsequently fetches the data model and the platform model documents from the SDN controller.

When the SDN controller performs NETCONF operations on the newly inserted or recently edited data models, an XSL engine invoked on the network element transforms the incoming YIN data to platform CLI/API, resulting in programming of the network element.

FIG. 1 illustrates a simplified block diagram of a network environment 100, which in the illustrated embodiment comprise an SDN 100, for enabling dynamic update of network device data models in accordance with embodiments described herein. SDN techniques in general enable a network (typically static in nature) to become more dynamic in nature. SDN opens networks to application developers, who may write applications to manage network elements and data flows passing through a network element, without requiring physical access to the network elements themselves. Thus, rather than a network element being a fixed-function "appliance," SDN views network hardware as part of a distributed computational system that can be manipulated by software. An application developer writing applications for an SDN may execute the application "in the network," which may include any device that which processes data flows between computing systems, such as a switching or routing element connecting host systems to a network (and devices connecting one computing network to another), as well as other computing devices able to execute the application while connected to the network. The application may execute commands and apply functions to the network devices (and the data flows) remotely or locally on the network element itself. Using applications in an SDN environment, developers may manage networking functions of a network element, such as routing, quality of service ("QoS"), and bandwidth allocation, as well as performance and/or properties of the network elements themselves. Additionally, different programming logic may be applied to different flows or packets in the same network topology, such that each network graph need not have its own instance of the SDN application.

SDN techniques, in general, provide additional flexibility and solidarity relative to conventional networks. Using an SDN controller, which may be located either centrally or on the respective network devices, a network administrator can configure the control plane and dictate how the network devices route data. For example, the network administrator may assign criteria or SDN rules that, when satisfied, instruct the network device to perform a specific action on the received packet (e.g., drop the packet, forward the packet to a particular network device, evaluate the packet using an application on the network device, etc.).

Referring again to FIG. 1, the SDN 100 includes a network controller 102, a plurality of network elements 104, and a plurality of host computers 106. A control plane is represented by dashed lines 108 and a data plane is represented by solid lines 110. It will be recognized that data packets are forwarded between network elements 104 via the data plane 110, while system configuration, management information, and routing table information is exchanged between the SDN controller 102 and network elements 104 via the control plane 108. The SDN controller 102 may be a generalized network controller configured to control the network elements 104 by performing control plane functionality, such as drawing a network map and defining the information in a routing table that defines what to do with incoming packets. The SDN controller 102 may be configured for management and control functionality of the control plane, which may include routing and resource management. The network elements 104 may be any device that receives and transmits data through the SDN network 100 according to an SDN-compatible communications protocol, such as OpenFlow.

Figure 2:
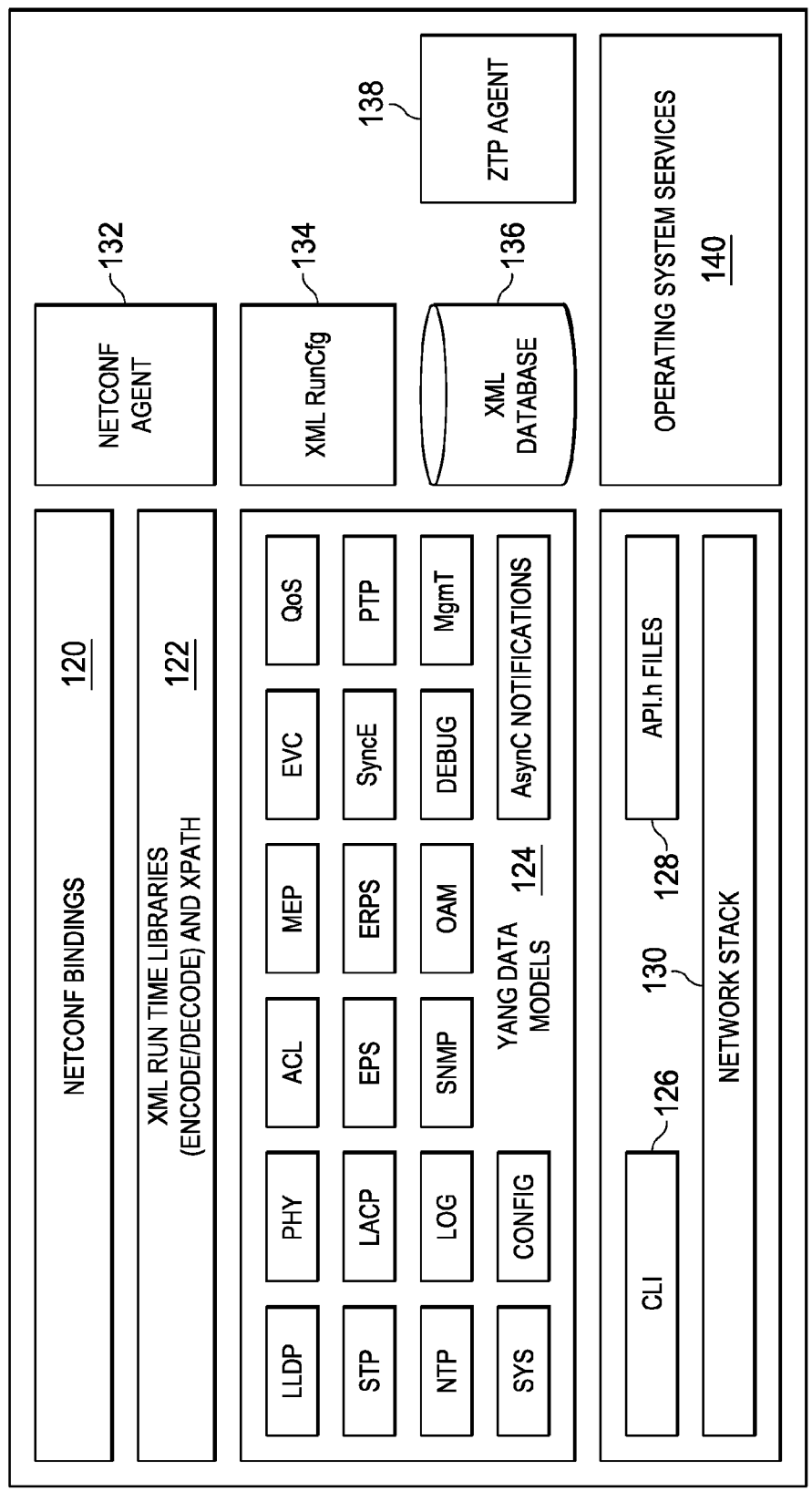
FIG. 2 is a simplified block diagram of a network element of the network environment of FIG. 1 illustrating an example of data modeling on such network elements in accordance with embodiments described herein.

FIG. 2 is block diagram illustrating data modeling on a network element, such as one of the network elements 104. As shown in FIG. 2, the network element 104 includes a NETCONF bindings layer 120, XML runtime libraries and XPATH 122, a variety of YANG data models 124, CLI files 126 and API files 128, and a network stack 130. The network element 104 further includes a NETCONF agent 132, XML run-config 134, an XML database 136, Zero Touch Provisioning ("ZTP") agent 138, and operating system services 140. In accordance with features described herein, the NETCONF agent 132 performs the functions of a NETCONF as defined in the aforementioned IETF RFC 6241.

The network stack 130, which is typically configured using CLI files 126, utilizes the operating system services 140. Device data modeling is accomplished using YANG data models 124, as per IETF RFC 6020. Operations defined by YANG data models 124 are transformed into CLI files 126 or API files 128. NETCONF bindings 120 function as a "glue" layer to bind NETCONF operations received from NETCONF layer 132 to the targeted YANG data models 124. XPATH 122 functions as an XML library assistant. ZTP agent 138 is an optional provisioning agent that may be used to automate the device provisioning at device boot up. XML run-config 134 and XML database 136 are XML-based running configuration and XML device database, respectively. When a new data-model (e.g., Y1731) is introduced in a follow-on release, the network elements, which may number in the thousands, will require a software upgrade. In certain cases, if bug fixes impacting a data-model are needed, the network elements again require a software upgrade. For devices that are not High Availability ("HA")/ In-Service Software Upgrade ("ISSU") capable, this means disruption of service.

Figure 3:
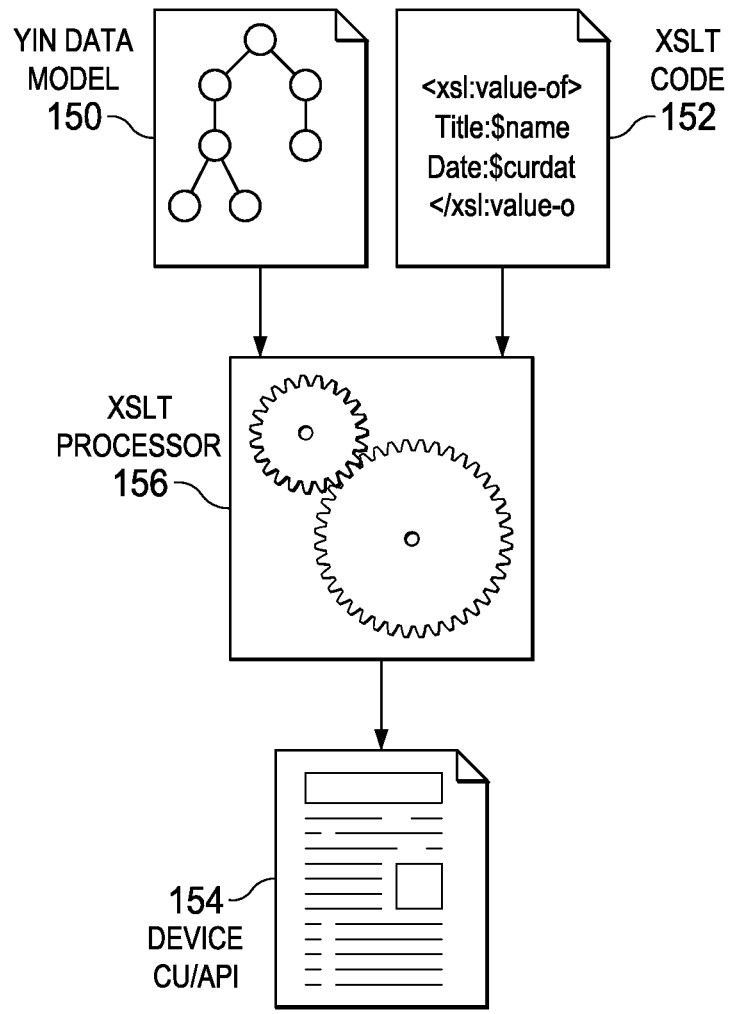
FIG. 3 is a simplified block diagram of a technique for enabling dynamic update of network device data models in accordance with embodiments described herein may be implemented.

FIG. 3 is a simplified block diagram of a technique for enabling dynamic update of network device data models in accordance with embodiments described herein may be implemented. As illustrated in FIG. 3, a new NETCONF capability ("data-model-update") is introduced to enable installation/updating/removal operations of the 2-tuple (yin-data-model; platform-model-transform) in a data store <dynamic-data-models> from a NETCONF client, such as an SDN controller (e.g., SDN controller 102). As shown in FIG. 3, yin-data-model is the YIN representation of the new YANG model being installed on the network element and is designated in FIG. 3 by a reference numeral 150. Platform-model-transform is an XML document (typically an XSLT document) (designated in FIG. 3 by a reference numeral 152) that enables transformation of YIN to platform CLI/ API 154 via a transform engine 156. If the platform-model is XSL, then transform engine 156 may be an XSLT processor. It will be recognized that native support of the feature represented by the new YIN data model (e.g., data model 150) is required.

FIG. 4 illustrates example code for an edit-config NET-CONF operation for inserting a new YANG model and transform document from an SDN controller to network elements. As previously noted, <dynamic-data-models/> identifies the target and the name of the new model to be inserted is y1731. The URL for the data model (<yang-url>) is https://<xnc-controller./models/y1731.yang. The URL for the platform model (<platform-model-transform>) is https:// <xnc-controller>/models/y1731.xsl. It will be noted that if the operation is "merge" or "replace", the 2-tuple for y1731 (.yang+xsl) will be created if it does not exist. If the operation is "create," the 2-tuple for y1731 (.yang+xsl) is created if it does not exist. If the y1731 YANG model already exists, a "data-exists" error is returned. If the operation is "delete," the model is deleted if it exists. If the model does not exist, a "data-missing" error is returned. It will also be noted that there is already an authenticated NETCONF session persistent to the SDN controller; therefore, there is no additional need for authentication. The network element proceeds to download the yang model and the platform model transform from the controller and updates its data store of known YANG models.

Figure 5:
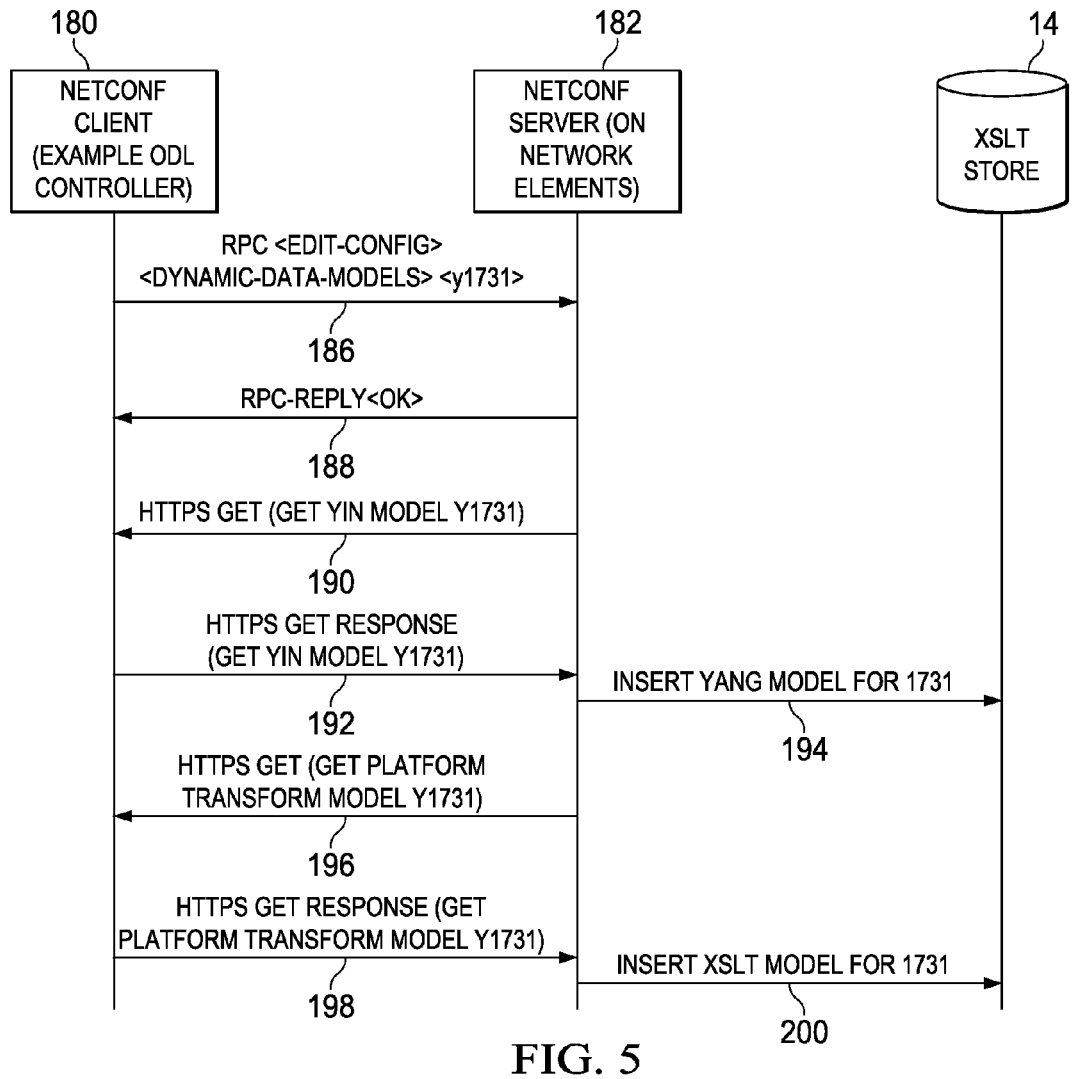
FIG. 5 is a simplified flow diagram of example operations executed in the network environment of FIG. 1 in implementing a technique for enabling dynamic update of network device data models in accordance with embodiments described herein.

FIG. 5 is a simplified flow diagram of example operations executed among a NETCONF client (e.g., an SDN controller) 180, a NETCONF server (e.g., a network element) 182, and an XSLT store 184 associated with the NETCONF server for implementing a technique for enabling dynamic update of network device data models in accordance with embodiments described herein. As shown in FIG. 5, in step 186, an "rpc<edit-config><dynamic-data-models><y1731>" message is sent from the client 180 to the server 182. In step 188, a response comprising an "rpc-reply<ok>" message is sent from the server 182 to the client 180. In step 190, the server 182 sends an HTTPS GET message to the client 180 to obtain the YIN model for the new YANG model (1731) to be installed. In step 192, the client 180 sends an HTTPS GET RESPONSE message, providing the requested YIN model to the server 182. In step 194, the server 182 transforms the YIN model to YANG model for 1731 and stores it in the XSLT store 184. It will be recognized that YANG to YIN transformation (and correspondingly, YIN to YANG transformation) is lossless, and is described in IETF RFC 6020. In step 196, the server 182 sends an HTTPS GET message to the client 180 to obtain the platform transform model for the new YANG model. In step 198, the client 180 sends an HTTPS GET RESPONSE message, providing the requested platform transform model for the new YANG model to the server 182. In step 200, the XSLT file for the new YANG model is stored in the XSLT store 184.

Figure 6:
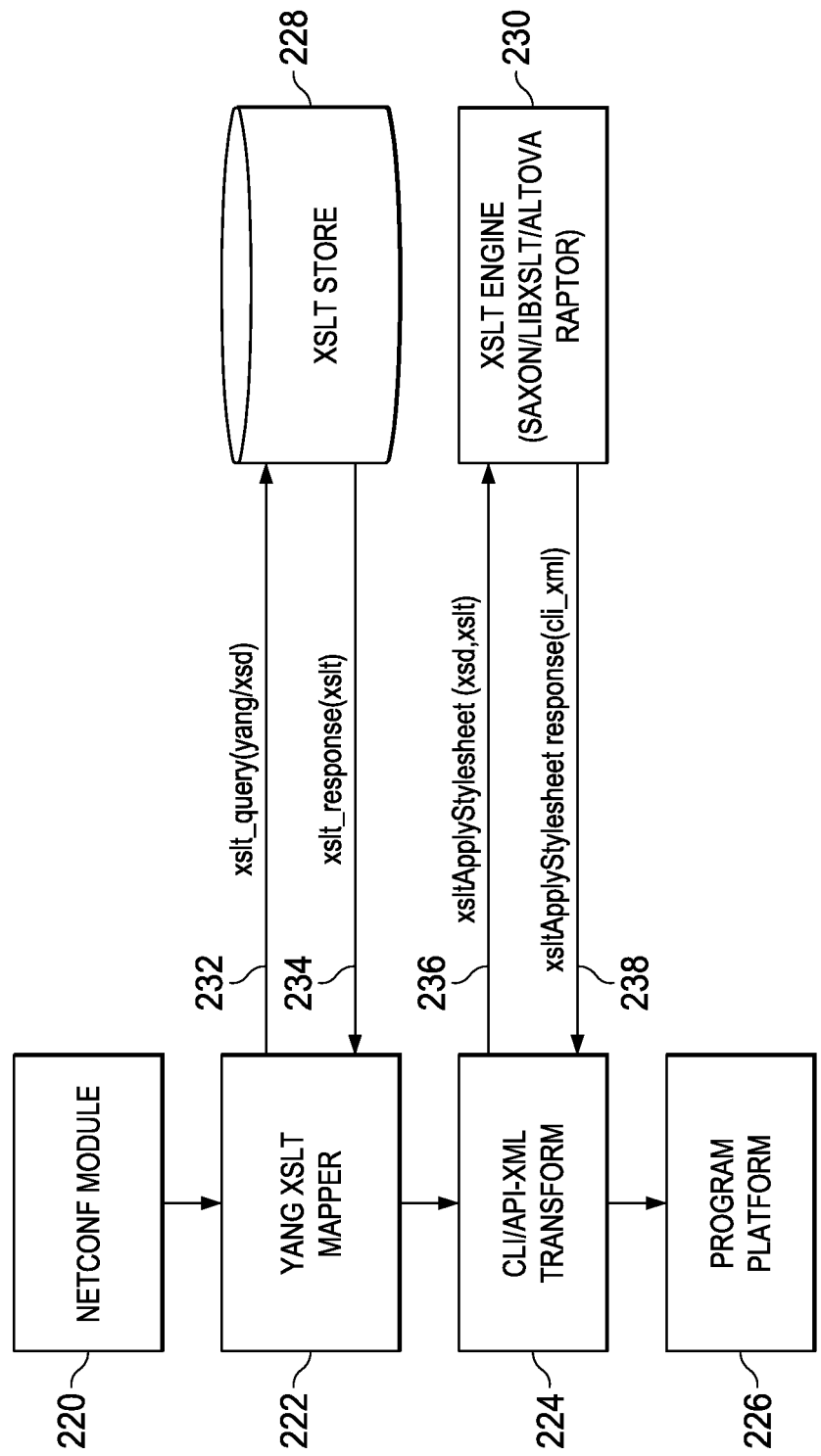
FIG. 6 is a simplified flow diagram of example operations executed in the network element of FIG. 2 in implementing a technique for enabling dynamic update of network device data models in accordance with embodiments described herein.

FIG. 6 is a representative example flow diagram of the process performed by a NETCONF server (or network element) after the YANG model and XSLT model have been stored in the XSLT store, as illustrated in FIG. 5. Any NETCONF messages received at the network element are processed by a NETCONF Module 220. The NETCONF Module 222 forwards NETCONF messages referencing a YANG model received at the network element to a YANG XSLT Mapper, which queries an XSLT store 228 for the corresponding XSLT translation document via an xslt_query (yang/xsd) 232. The XSLT store 228 returns the requested XSLT document via an xslt_response (xslt) 234. The two YANG model and the translation document are forwarded to a CLI/API-XML Transform module 224, which forwards an xsltApplyStylesheet (xsd,xslt) command 236 to an XSLT Engine 230. The XSLT engine 230 applies the translation document to the model and returns a device CLI/API to the Transform module 224 via an xsltApplyStylesheet_response (cli_xml) 238. The Transform module 224 forwards the CLI/API to a Program Platform module 226, which programs the network element accordingly. In FIG. 2, the network element programming could be accomplished by device CLI 126 or appropriate API calls 128.

During the initial capabilities exchange between the controller and the network element, an additional capability that supports dynamic-data model update is executed. When the controller determines that the network element is capable of supporting dynamic data model update, the YANG model and platform-transform-model download (as illustrated in FIG. 5) may be performed. In addition to the initial capabilities exchange, the SDN controller may provide a Northbound API service to update the models on the network elements on demand. This Northbound API can be used by applications above the SDN controller to specify YIN/ YANG and PlatformTransform models, to update for a set of Network Elements.

To achieve the embodiments described herein, the SDN controller and network elements must meet certain requirements. With regard to the SDN controller, it must be provisioned to update 2-tuple (yin-data-model, platform-model-transform) along with other associations like network element base software capacities (whether the base software in the targeted network element supports the platform features defined in the platform-model-transform). The SDN controller must be a NETCONF client that recognizes and handles the newly introduced capability referred to herein as "dynamic-data-model-update." The SDN controller must have a decision engine to either auto-push or push on demand, as well as a YANG model and a platform-transform-model, depending on the NETCONF server module capabilities advertised by the network elements. The SDN controller must host an HTTPS or any other type of secure server by means of which the network elements can download the new models. Finally, the SDN controller is highly recommended to have a new SDN service that is capable of marshalling all downstream device capabilities and providing the ability to upgrade the models based on either operator inputs or preconfigured policy.

Similarly, the network elements to be updated dynamically must meet certain requirements, including having installed thereon a NETCONF server module with the implementation thereof updated to advertise the newly introduced dynamic-data-model-update capability and a database (e.g., XSLT store) in which to store the 2-tuple (yin-data-model, platform-model-transform) and from which the 2-tuple (yin-data-model, platform-model-transform) may be subsequently retrieved. The network elements must also include an XSLT or other suitable engine for transforming incoming RPC message to platform actions based on the applicable platform-model-transform. Finally, the network elements must have a secure client, like HTTPS client or other client means, to pull the 2-tuple (yin-data-model, platform-model-transform) from the network controller.

Embodiments shown and described herein enable extension of the NETCONF protocol to enable a NETCONF client, such as an SDN controller, to direct network elements (comprising NETCONF servers) dynamically to create, update, and delete YANG data models at runtime. A new capability added to the NETCONF servers in network elements is included to create, update, and delete data models at runtime. Additionally, the notion of 2-tuple (yin-data-model, platform-model-transform) is introduced. Depending on the OS of the network element, the platform-model-transform can vary addressing a one-to-many mapping of common YANG models across different network element OSes. Platform-model-transform is not tied to a particular technology; rather, it may be any XML scripting language that can transform common YANG models to platform-specific implementations. It may be XSLT or any other implementation. A trigger is identified, in the form of using the initial-capabilities exchange between the controller and network element to also auto-push or push on demand, YANG model and platform-transform-model on network elements. Additionally, a new Northbound API described in [033] is provided an SDN service, which is capable of marshalling all downstream device capabilities and provides the ability to upgrade the models, based on either operator inputs or pre-configured capability, has been defined. Still further, embodiments provide the capability to evolve SDN adoption for service providers without incurring a charge of upgrading large numbers of network elements (without requiring device reboot and disruption of services during the upgrade.

Figure 7A:
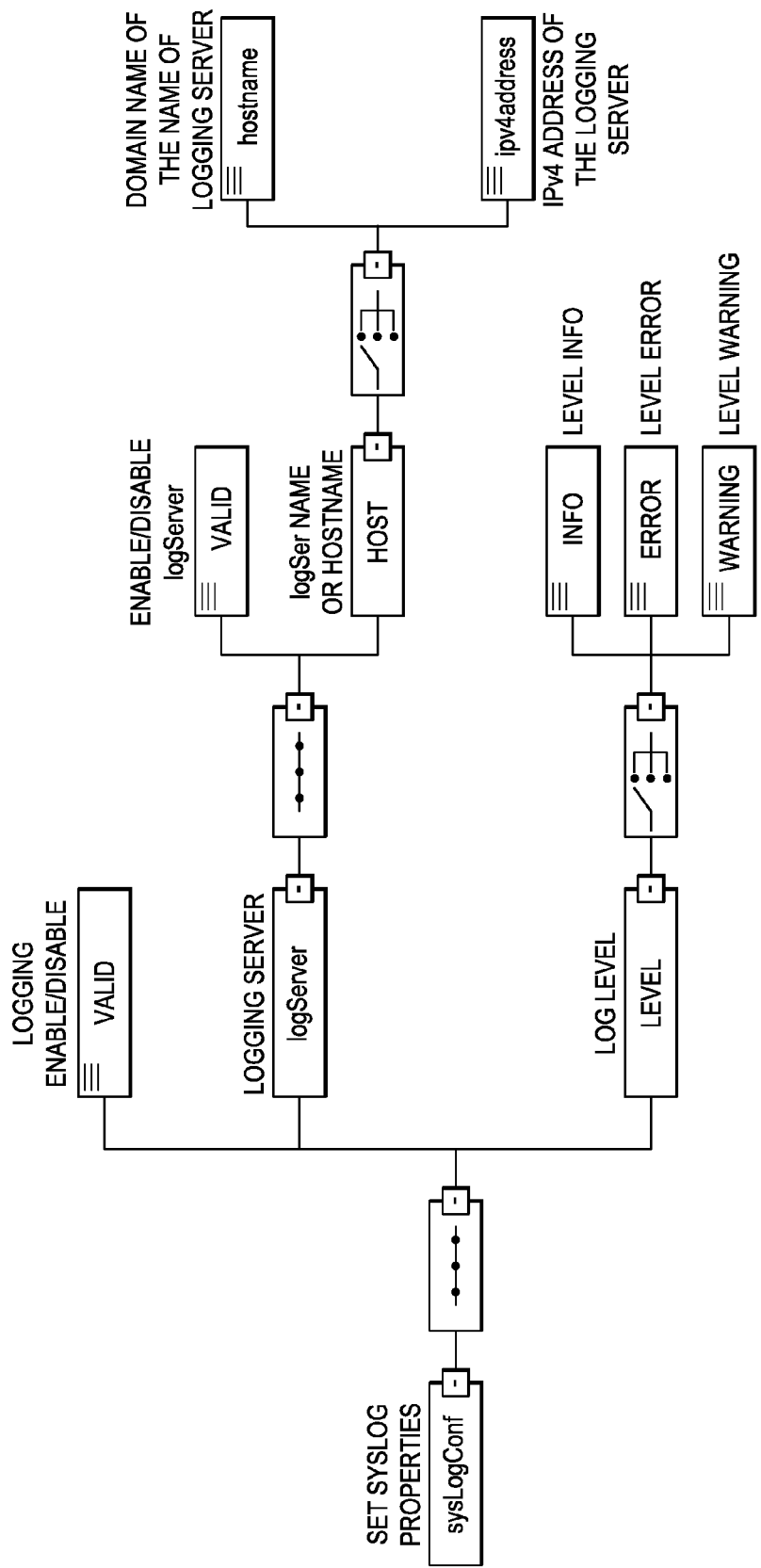
FIG. 7A illustrates an XML schema definition document ("XSD") for use in implementing a technique for enabling dynamic update of network device data models in accordance with embodiments described herein.

FIGS. 7A-7D respectively illustrate XML schema definition ("XSD"), an XML input file conforming to XSD, an XSLT specification for syslog XSD applied to the XML input file of FIG. 7B, and an output SML file comprising the sequence of CLI programmed on the network element.

Turning to FIG. 8, FIG. 8 is a simplified block diagram of an example machine (or apparatus) 270 that may be implemented as an element of a system for use in implementing a technique for enabling dynamic update of network device data models in accordance with embodiments described herein. The example machine 270 corresponds to network elements and computing devices that may be deployed in system 100, including, for example, SDN controller 102 and network elements 104. In particular, FIG. 8 illustrates a block diagram representation of an example form of a machine within which software and hardware cause machine 270 to perform any one or more of the activities or operations discussed herein. As shown in FIG. 8, machine 270 may include a processor 272, a main memory 273, secondary storage 274, a wireless network interface 275, a wired network interface 276, a user interface 277, and a removable media drive 278 including a computer-readable medium 279. A bus 271, such as a system bus and a memory bus, may provide electronic communication between processor 272 and the memory, drives, interfaces, and other components of machine 270.

Processor 272, which may also be referred to as a central processing unit ("CPU"), can include any general or special-purpose processor capable of executing machine readable instructions and performing operations on data as instructed by the machine readable instructions. Main memory 273 may be directly accessible to processor 272 for accessing machine instructions and may be in the form of random access memory ("RAM") or any type of dynamic storage (e.g., dynamic random access memory ("DRAM")). Secondary storage 274 can be any non-volatile memory such as a hard disk, which is capable of storing electronic data including executable software files. Externally stored electronic data may be provided to computer 270 through one or more removable media drives 278, which may be configured to receive any type of external media such as compact discs ("CDs"), digital video discs ("DVDs"), flash drives, external hard drives, etc.

Wireless and wired network interfaces 275 and 276 can be provided to enable electronic communication between machine 270 and other machines via networks (e.g., control plane 108, data plane 110. In one example, wireless network interface 275 could include a wireless network controller ("WNIC") with suitable transmitting and receiving components, such as transceivers, for wirelessly communicating within a network. Wired network interface 276 can enable machine 270 to physically connect to a network by a wire line such as an Ethernet cable. Both wireless and wired network interfaces 275 and 276 may be configured to facilitate communications using suitable communication protocols such as, for example, Internet Protocol Suite ("TCP/IP"). Machine 270 is shown with both wireless and wired network interfaces 275 and 276 for illustrative purposes only. While one or more wireless and hardwire interfaces may be provided in machine 270, or externally connected to machine 270, only one connection option is needed to enable connection of machine 270 to a network.

A user interface 277 may be provided in some machines to allow a user to interact with the machine 270. User interface 277 could include a display device such as a graphical display device (e.g., plasma display panel ("PDP"), a liquid crystal display ("LCD"), a cathode ray tube ("CRT"), etc.). In addition, any appropriate input mechanism may also be included such as a keyboard, a touch screen, a mouse, a trackball, voice recognition, touch pad, etc.

Removable media drive 278 represents a drive configured to receive any type of external computer-readable media (e.g., computer-readable medium 279). Instructions embodying the activities or functions described herein may be stored on one or more external computer-readable media. Additionally, such instructions may also, or alternatively, reside at least partially within a memory element (e.g., in main memory 273 or cache memory of processor 272) of machine 270 during execution, or within a non-volatile memory element (e.g., secondary storage 274) of machine 270. Accordingly, other memory elements of machine 270 also constitute computer-readable media. Thus, "computer-readable medium" is meant to include any medium that is capable of storing instructions for execution by machine 270 that cause the machine to perform any one or more of the activities disclosed herein.

Not shown in FIG. 8 is additional hardware that may be suitably coupled to processor 272 and other components in the form of memory management units ("MMU"), additional symmetric multiprocessing ("SMP") elements, physical memory, peripheral component interconnect ("PCI") bus and corresponding bridges, small computer system interface ("SCSI")/integrated drive electronics ("IDE") elements, etc. Machine 270 may include any additional suitable hardware, software, components, modules, interfaces, or objects that facilitate the operations thereof. This may be inclusive of appropriate algorithms and communication protocols that allow for the effective protection and communication of data. Furthermore, any suitable operating system may also be configured in machine 270 to appropriately manage the operation of the hardware components therein.

The elements, shown and/or described with reference to machine 270, are intended for illustrative purposes and are not meant to imply architectural limitations of machines such as those utilized in accordance with the present disclosure. In addition, each machine may include more or fewer components where appropriate and based on particular needs. As used herein in this Specification, the term "machine" is meant to encompass any computing device or network element such as servers, routers, personal computers, client computers, network appliances, switches, bridges, gateways, processors, load balancers, wireless LAN controllers, firewalls, or any other suitable device, component, element, or object operable to affect or process electronic information in a network environment.

In example implementations, at least some portions of the activities related to the system described herein may be implemented in software in, for example, SDN controller 102, network elements 104. In some embodiments, this software could be received or downloaded from a web server, provided on computer-readable media, or configured by a manufacturer of a particular element in order to provide this system for implementing autonomic LISP for enabling a secure hybrid cloud extension in accordance with features of embodiments described herein. In some embodiments, one or more of these features may be implemented in hardware, provided external to these elements, or consolidated in any appropriate manner to achieve the intended functionality.

In one example implementation, SDN controller 102, network elements 104 are network devices or computing devices, which may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

Furthermore, in the embodiments of the system described and shown herein, some of the processors and memory elements associated with the various network elements may be removed, or otherwise consolidated such that a single processor and a single memory location are responsible for certain activities. Alternatively, certain processing functions could be separated and separate processors and/or physical machines could implement various functionalities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of the example embodiments, one or more memory elements (e.g., main memory 273, secondary storage 274, computer-readable medium 279) can store data used for the automatic configuration and registration operations described herein. This includes at least some of the memory elements being able to store instructions (e.g., software, logic, code, etc.) that are executed to carry out the activities described in this Specification. A processor can execute any type of instructions associated with the data to achieve the operations detailed herein in this Specification. In one example, one or more processors (e.g., processor 272) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable read only memory ("EEPROM")), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

Components of network environment 100 may keep information in any suitable type of memory (e.g., random access memory ("RAM"), read-only memory ("ROM"), erasable programmable ROM ("EPROM"), electrically erasable programmable ROM ("EEPROM"), etc.), software, hardware, or in any other suitable component, device, element, or object where appropriate and based on particular needs. Any of the memory items discussed herein should be construed as being encompassed within the broad term "memory element." The information being read, used, tracked, sent, transmitted, communicated, or received by network environment 100 could be provided in any database, register, queue, table, cache, control list, or other storage structure, all of which can be referenced at any suitable timeframe. Any such storage options may be included within the broad term "memory element" as used herein. Similarly, any of the potential processing elements and modules described in this Specification should be construed as being encompassed within the broad term "processor."

It should be noted that much of the infrastructure discussed herein can be provisioned as part of any type of network element. As used herein, the term "network element" or "network device" can encompass computers, servers, network appliances, hosts, routers, switches, gateways, bridges, virtual equipment, load-balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one implementation, network elements/devices can include software to achieve (or to foster) the management activities discussed herein. This could include the implementation of instances of any of the components, engines, logic, etc. shown in the FIGURES. Additionally, each of these devices can have an internal structure (e.g., a processor, a memory element, etc.) to facilitate some of the operations described herein. In other embodiments, these management activities may be executed externally to these devices, or included in some other network element to achieve the intended functionality. Alternatively, these network devices may include software (or reciprocating software) that can coordinate with other network elements in order to achieve the management activities described herein. In still other embodiments, one or several devices may include any suitable algorithms, hardware, software, components, modules, interfaces, or objects that facilitate the operations thereof.

Note that with the numerous examples provided herein, interaction may be described in terms of two, three, four, or more network elements. However, this has been done for purposes of clarity and example only. It should be appreciated that the system can be consolidated in any suitable manner. Along similar design alternatives, any of the illustrated computers, modules, components, and elements of the FIGURES may be combined in various possible configurations, all of which are clearly within the broad scope of this Specification. In certain cases, it may be easier to describe one or more of the functionalities of a given set of flows by only referencing a limited number of network elements. It should be appreciated that the system as shown in the FIGURES and its teachings are readily scalable and can accommodate a large number of components, as well as more complicated/sophisticated arrangements and configurations. Accordingly, the examples provided should not limit the scope or inhibit the broad teachings of the system as potentially applied to a myriad of other architectures.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

In the foregoing description, for purposes of explanation, numerous specific details are set forth in order to provide a thorough understanding of the disclosed embodiments. It will be apparent to one skilled in the art, however, that the disclosed embodiments may be practiced without these specific details. In other instances, structure and devices are shown in block diagram form in order to avoid obscuring the disclosed embodiments. In addition, references in the Specification to "one embodiment", "example embodiment", "an embodiment", "another embodiment", "some embodiments", "various embodiments", "other embodiments", "alternative embodiment", etc. are intended to mean that any features (e.g., elements, structures, modules, components, steps, operations, characteristics, etc.) associated with such embodiments are included in one or more embodiments of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
performing by a network controller comprising a Software-Defined Network ("SDN") controller at least one of installing, updating, or removing from a data store associated with the network controller a data model and an associated transformation document identified by a 2-tuple, wherein the performing is accomplished using a NETCONF session;
transmitting a message from a network element to the network controller, the message identifying the data store associated with network controller and the data model and the transformation document stored in the identified data store;
downloading the identified data model and identified transformation document to the network element;
applying the downloaded transformation document to the downloaded data model to generate a platform interface file; and
programming the platform interface file at the network element;
wherein the 2-tuple is defined as yin-data-model, platform-model-transform, in a data store where a yin-data-model is a YIN representation of a new YANG data model to be installed on a network element, and a platform model transform is an XSLT document that enables transformation of the YIN representation to Command Line Interface ("CLI")/API via a transform engine.

2. The method of claim 1, wherein the data model is a YANG data model.

3. The method of claim 1, wherein the data model is a YIN representation of a YANG data model.

4. The method of claim 1, wherein the transformation document comprises an eXtensible Stylesheet Language Transformation ("XSLT") document.

5. The method of claim 1, wherein the platform interface file comprises one of a Command Line Interface ("CLI") file and an Application Programming Interface ("API") file.

6. The method of claim 1, wherein the transmitting and downloading are performed using a NETCONF session.

7. The method of claim 1, wherein the network element comprises a NETCONF server.

8. The method of claim 1, wherein the network controller comprises a NETCONF client.

9. One or more non-transitory tangible media that includes code for execution and when executed by a processor is operable to perform operations comprising:
performing by a network controller comprising a Software-Defined Network ("SDN") controller at least one of installing, updating, or removing from a data store associated with the network controller a data model and an associated transformation document identified by a 2-tuple, wherein the performing is accomplished using a NETCONF session;
transmitting a message from a network element to the network controller, the message identifying the data store associated with network controller and the data model and the transformation document stored in the identified data store;
downloading the identified data model and identified transformation document to the network element;
applying the downloaded transformation document to the downloaded data model to generate a platform interface file; and
programming the platform interface file at the network element;
wherein the 2-tuple is defined as yin-data-model, platform-model-transform, in a data store where a yin-data-model is a YIN representation of a new YANG data model to be installed on a network element, and a platform model transform is an XSLT document that enables transformation of the YIN representation to Command Line Interface ("CLI")/API via a transform engine.

10. The media of claim 9, wherein the data model is a YANG data model.

11. The media of claim 9, wherein the data model is a YIN representation of a YANG data model.

12. The media of claim 9, wherein the transformation document comprises an eXtensible Stylesheet Language Transformation ("XSLT") document.

13. The media of claim 9, wherein the platform interface file comprises one of a Command Line Interface ("CLI") file and an Application Programming Interface ("API") file.

14. The media of claim 9, wherein the transmitting and downloading are performed using a NETCONF session.

15. The media of claim 9, wherein the network element comprises a NETCONF server.

16. The media of claim 9, wherein the network controller comprises a NETCONF client.

17. An apparatus comprising:
a memory element configured to store data; and
a processor operable to execute instructions associated with the data;
wherein the apparatus is configured to:
perform by a network controller comprising a Software-Defined Network ("SDN") controller at least one of installing, updating, or removing from a data store associated with the network controller a data model and an associated transformation document identified by a 2-tuple, wherein the performing is accomplished using a NETCONF session;
transmit a message from a network element to the network controller, the message identifying the data store associated with network controller and the data model and the transformation document stored in the identified data store;
download the identified data model and identified transformation document to the network element;
apply the downloaded transformation document to the downloaded data model to generate a platform interface file; and
program the platform interface file at the network element;
wherein the 2-tuple is defined as yin-data-model, platform-model-transform, in a data store where a yin-data-model is a YIN representation of a new YANG data model to be installed on a network element, and a platform model transform is an XSLT document that enables transformation of the YIN representation to Command Line Interface ("CLI")/API via a transform engine.

18. The apparatus of claim 17, wherein the data model is a YANG data model.

19. The apparatus of claim 17, wherein the transformation document comprises an eXtensible Stylesheet Language Transformation ("XSLT") document.

20. The apparatus of claim 17, wherein the transmitting and downloading are performed using a NETCONF session.

* * * * *